United States Patent [19]

Brinkman

[11] Patent Number: 4,997,900

[45] Date of Patent: Mar. 5, 1991

[54] POWDER COATING COMPRISING ACETONE OXIME BLOCKED DIISOCYANATE AND POLYESTER

[75] Inventor: Larry F. Brinkman, Maple Grove, Minn.

[73] Assignee: Cargill, Incorporated, Minneapolis, Minn.

[21] Appl. No.: 290,157

[22] Filed: Dec. 27, 1988

[51] Int. Cl.$^5$ .............................................. C08G 18/80
[52] U.S. Cl. ........................................... 528/45; 528/83
[58] Field of Search ............................................ 528/45

[56] References Cited

U.S. PATENT DOCUMENTS

| | | | |
|---|---|---|---|
| 3,931,117 | 1/1976 | Leonard | 528/45 |
| 4,151,152 | 4/1979 | Schmitt et al. | 524/484 |
| 4,480,008 | 10/1974 | Farronato | 428/425.8 |
| 4,540,766 | 9/1985 | Chang et al. | 528/45 |
| 4,543,405 | 9/1985 | Ambrose et al. | 528/85 |
| 4,656,211 | 4/1987 | Nasu et al. | 528/45 |
| 4,748,200 | 5/1988 | Nasu | 528/45 |
| 4,761,465 | 8/1988 | Speranza et al. | 528/45 |
| 4,794,154 | 12/1988 | Benefiel | 528/45 |
| 4,806,585 | 2/1989 | Nakayama et al. | 524/376 |
| 4,824,925 | 4/1989 | Karmarchik, Jr. et al. | 528/45 |

Primary Examiner—Morton Foelak
Assistant Examiner—Dennis R. Daley
Attorney, Agent, or Firm—Fitch, Even, Tabin & Flannery

[57] ABSTRACT

In accordance with the present invention, a blocked isocyanate composition which is useful as a curing agent for powder coatings is prepared from the reaction of tetramethylxylene diisocyanate and acetone oxime. In a preferred embodiment, a polyol is reacted with the isocyanate to provide a prepolymer with urethane linkages wherein the isocyanate groups of the prepolymer are substantially blocked with acetone oxime. The blocked isocyanate composition of the present invention can be used as a curing agent for powder coatings, adhesives and high solid coatings which are cured by baking. The blocked isocyanate composition of the invention can be used as a cross-linking agent for a hydroxy-containing polyester, a hydroxy-containing acrylic or methacrylic polymer or any other active hydrogen containing polymer.

7 Claims, No Drawings

ND POLYESTER

POWDER COATING COMPRISING ACETONE OXIME BLOCKED DIISOCYANATE AND POLYESTER

FIELD OF THE INVENTION

The present invention is directed to the manufacture of blocked isocyanate curing agents, and more particularly, is directed to the production of blocked isocyanate curing agents from tetramethylxylene diioscyanate and acetone oxime which are particularly useful in the curing of hydroxylated polyester powder coating compositions.

BACKGROUND OF THE INVENTION

Powder coating compositions and techniques have been used in the provision of protective films for a considerable period of time. There is a substantial amount of prior art describing the use of blocked isocyanates in combination with hydroxylated polyesters for use in the preparation of powder coatings, adhesives and high solids, solvent based, fluid coatings. There have been several problems associated with heretofore known powder-coatings based on the use of blocked isocyanate curing agents. At present, commercially available blocked aliphatic isocyanates require at least about 160° C. curing temperature for at least about 60 minutes to achieve a cure.

U.S. Pat No. 4,055,551 describes a continuous method for manufacture of blocked isocyanate curing agents to alleviate the problem of the formation of gel particles when batch reactions are used. The method described in this patent includes the steps of separately and continuously metering a polyisocyanate and a blocking agent for the polyisocyanate into a reaction zone in stoichiometric proportion under reaction conditions and in which the reaction mixture is continuously withdrawn from the reaction zone to provide a blocked isocyanate curing agent. The isocyanates particularly disclosed in this patent include isophorone diisocyanate, toluene diisocyanate, isocyanate polyol pre-polymers and mixtures thereof. The particular blocking agents used in this patent are epsilon caprolactam and methylethyl ketoxime.

In an article by P. McBride, "Lower Temperature Curing Blocked Isocyanate for Use in Powder Coatings," J. Oil Col. Chem. Assoc., 1982, 65, 257–262, the general requirements for formulating powder-coatings are discussed. As indicated in the McBride article, the technique of powder coating is well-known. In this method, the powder is electrically charged during the spray application and the substrate to be coated is grounded. Thus, the charged powder is attracted to the grounded substrate and covers the substrate. The coated substrate is then heated to a temperature above the melting point of the powder, the powder melts, flows out and a smooth, continuous finish results.

The pollution advantages of powder coating are that no solvent is involved and loss of raw material via venting to the atmosphere is minimized. However, the principal disadvantage of powder coatings, based on hydroxylated polyester resins, is that higher heating temperatures are required to cure the powder coatings than those required for liquid coatings. Such higher heating temperatures are required to dissociate the blocked isocyanates which are present to serve as a cross-linking agent for the hydroxylated polyester. A temperature of at least 180° C. for fifteen minutes for powder coatings has often been required compared to 135° C. for twenty-five minutes for liquid coatings. Thus, while powder coatings minimize the pollution problem, there is still a problem from an energy standpoint for a polyester-based powder coating and there is a need for a polyester-based powder coating that can be unblocked and cured at a lower temperature.

It is also pointed out in the McBride article that there are a number of conflicting requirements for powder coatings which actually limit the extent to which the cure temperature can be reduced. For example, the finely divided powder must remain in a free-flowing state even after extended storage. Agglomeration of the powder would render the powder unusable. Agglomeration is usually the result of cold flow which is related to the transition temperature (Tg). It is desirable to have a Tg of about 40° C. or higher.

The parameters for an improved curing reaction for hydroxyl-functional polyesters set forth in the McBride article include: (1) effect the cure at temperatures of 140°–160° C. in less than 30 minutes; (2) emit no volatiles during curing; (3) impart good, physical properties to the finished coating; (4) permit all coating ingredients to be mixed without any pre-curing of the components occurring; (5) allow sufficient flow of the molten coating during fusion to give a high-gloss finish with good appearance; (6) allow stable storage of the powder coating.

The composition proposed in the McBride article to meet the above parameters for a hydroxyl-functional polyester based coating was an adduct of 1,4-cyclohexane bis(methyl isocyanate) and diisobutyl ketoxime. The proposed composition was used as a curing agent for use with hydroxylated polyesters. The powder coatings provided by the adduct of 1,4-cyclohexane bis(methyl isocyanate) and diisobutyl ketoxime had a curing temperature of about 160° C. While this composition is an improvement over the prior art which required curing temperatures of 180° C., it would be desirable to produce a blocked isocyanate which can be used to formulate hydroxylated polyester powder coating compositions which can be cured at a temperature of less than 150° C., preferably at about 140° C. or below. Powder coatings of the present invention can be unblocked and cured at temperatures of about 140° C. or below.

Powder coating compositions usually involve a cross-linking reaction between a hydroxylated polyester and a diisocyanate. This is an addition reaction involving no elimination products. A significant problem, however, is that the reaction can take place at temperatures as low as 90° C. in thirty minutes. Therefore, it has been necessary to "block" the isocyanate groups in a manner which render them inactive at temperatures below 180° C. but allow the regeneration of the isocyanate groups above this temperature. Isocyanates are usually blocked by reaction with a number of active hydrogen compounds, such as lactams or ketoximes. As indicated above, it is desirable to provide a blocked isocyanate component of a powder coating composition which has an unblocking or disassociation temperature lower than 180° C. and preferably lower than 150° C. Most preferably, it would be desirable to provide an isocyanate component that could be unblocked at temperatures of about 140° C. Thus far, the prior art has not provided a blocked isocyanate for use in conjunction with hydroxylated polyesters which can be unblocked at temperatures of about 140° C. This is in spite of the fact that many potential isocyanate materials and blocking agents have been proposed. For example, in U.S. Pat. No. 3,931,117 to Leonard, the following isocyanate materials were proposed for use in a coating powder: isophorone diisocyanate, 4,4'-methylene bis-(cycohexyl isocyanate), toluene diisocyanate, tetramethylene diisocyanate, pentamethylene diisocyanate, hexamethylene diisocyanate, propylene-1,2-diisocyanate, butylene-1,2-diisocyanate, ethylene diisocyanate, cyclopentylene-1,3-diisocyanate, cyclohexylene-1,3-diisocyanate, m-phenylene diisocyanate, p-phenylene diisocyanate, 4,4'-diphenyl diisocyanate, 1,5-napthalene diisocyanate, 2,4-toluene diisocyanate, 2,6-toluene diisocyanate, toluene trisisocyanate, 1,4-xylene diisocyanate, and 4,4'-diphenylmethane diisocyanate.

Among the blocking agents proposed for use in combination with the isocyanate, epsilon caprolactam, methylethyl ketoxime and acetone oxime have been proposed. The McBride reference specifically proposes the use of diisobutyl ketoxime in combination with 1,4-cyclohexane bis(methyl isocyanate). U.S. Pat. No. 4,055,551 to Panandiker et al. proposes the use of epsilon caprolactam or methylethyl ketoxime. U.S. Pat. No. 4,649,067 to Gras proposes the use of ethyl caprolactam or acetoxime.

It has also been proposed, such as described in U.S. Pat. No. 4,055,051 to Panandiker that, a polyisocyanate can be extended to provide a pre-polymer with urethane linkages by reacting the polyisocyanate with a polyol. Various polyols have been suggested for use, such as trimethylol propane, neopentyl glycol, cyclohexane dimethanol, alkylene glycols and other aliphatics diols and triols, such as pentaerithritol, ethylene glycol, hydroxy-polycaprolactones, trimethylol ethane, tris(hydroxy ethyl) isocyanurate and mixtures of these compounds.

Accordingly, it is a principal object of the present invention to provide a particular blocked isocyanate composition which can be used as a cross-linking agent for hydroxylated polyesters.

It is another object of the present invention to provide a blocked isocyanate composition from the reaction product of tetramethylxylene diisocyanate and acetone oxime for use as curing agent for powder coatings, adhesives and high solids baking coatings.

It is a further object of the present invention to provide a powder coating composition which can be cured at temperatures as low as 130° C. in periods of time of as low as thirty minutes.

It is a still further object of the present invention to provide a blocked isocyanate composition from tetramethylxylene diisocyanate which has been extended with a polyhydric compound and which has been blocked by use of acetone oxime.

These and other objects will become more apparent from the following description and the appended claims.

SUMMARY OF THE INVENTION

In accordance with the present invention, a blocked isocyanate composition which is useful as a curing agent for powder coatings is prepared from the reaction of tetramethylxylene diisocyanate and acetone oxime. In a preferred embodiment, a polyol is reacted with the isocyanate to provide a prepolymer with urethane linkages wherein the isocyanate groups of the prepolymer are substantially blocked with acetone oxime. The blocked isocyanate composition of the present invention can be used as a curing agent for powder coatings, adhesives and high solid coatings which are cured by baking. The blocked isocyanate composition of the invention can be used as a cross-linking agent for a hydroxy-containing polyester, a hydroxy-containing acrylic or methacrylic polymer or any other active hydrogen containing polymer.

DETAILED DESCRIPTION OF THE INVENTION

The present invention provides a unique blocked isocyanate composition prepared from the reaction of tetramethylene xylene (TMXDI) and acetone oxime and a unique powder coating suitable for the preparation of protective films. The powder coating comprises an intimate mixture of the blocked isocyanate of the invention together with an active hydrogen containing polymer, such as a hydroxy-containing polyester or a hydroxy-containing acrylic or methacrylic polymer derived from hydroxy lower alkyl acrylate or methacrylate, a lower alkyl acrylate or methacrylate and optionally, styrene or vinyl toluene. It is also possible to utilize the blocked isocyanate of the invention with mixtures of hydroxylated polyesters and hydroxy containing acrylic or methacrylic polymers. The blocked isocyanate is present in the powder coating at a level sufficient to provide from about 0.6 to about 1.5 isocyanate groups for each hydroxy group in the powder coating mixture.

Upon heating the powder coating, the blocked isocyanate dissociates thereby liberating the isocyanate groups and the blocking acetone oxime. The liberated isocyanate groups thereupon react with the active hydrogen containing polymer forming a protective film polymer containing urethane linkages. The powder coating is particularly suitable for use with electrostatic spraying.

The blocked isocyanate of the invention is readily prepared by reacting acetone oxime and TMXDI, preferably in the presence of an appropriate catalyst, such as dibutyltin dilaurate triethylene diamine, dibutyltin diacetate, dibutyltin dichloride and stannous octoate. The TMXDI and acetone oxime are preferably heated to a suitable temperature for effecting the reaction prior to combining the components (e.g. about 35°–40° C. for the TMXDI and about 70°–90° C. for the acetone oxime. The acetone oxime is preferably present in the reaction mixture at least at a stoichiometric level and most preferably in slight stoichiometric excess to the tetramethylxylene diisocyanate.

In a preferred embodiment of the present invention, a polyol is reacted with the isocyanate and the acetone oxime to provide a blocked isocyanate prepolymer with urethane linkages. The molecular weight of the prepolymer is controlled by varying the specific ratio of isocyanate and polyol components employed. In general, it is desired to use a stoichiometric excess of the isocyanate to the polyol. In particular, a preferred composition contains from about 3 to about 4 moles of isocyanate per mole of polyol, most preferably about 3.5 moles of isocyanate per mole of polyol. Suitable polyol components are trimethylol propane, ethylene glycol, 1,4-butane diol, 1,6-hexanediol, neopentyl glycol, diethylene glycol, triethylene glycol, dipropylene glycol, diethanol methylamine, triethanolamine, trimethylolethane, cyclohexane dimethanol, and pentaerythritol. A particularly preferred polyol is trimethylol propane.

When it is desired to use a prepolymer, as the blocked isocyanate component of the curing agent, the prepolymer may either be preformed by a batch process, or the isocyanate and polyol components may be simultaneously metered in the desired ratio into a reaction zone together with the acetone oxime. The amount of the acetone oxime introduced into the reaction zone, of course, is based on the "free" isocyanate functionality of the prepolymer. By "free" isocyanate functionality in this context is meant the excess isocyanate functionality after subtracting the polyol hydroxyl functionality.

The three components of the blocked isocyanate prepolymer, i.e. acetone oxime, TMXDI, and a polyol, may be reacted in a continuous or a batch process in a variety of ways. For example, the TMXDI and the acetone oxime may be first reacted, as previously described, followed by reaction with the polyol. Alternatively, the polyol and TMXDI may be first reacted, followed by reaction with the acetone oxime. In a further method, the acetone oxime can be mixed with the polyol followed by reaction of this mixture with TMXDI.

In a preferred method, the acetone oxime, polyol and TMXDI are continuously and simultaneously mixed and reacted. In this method, for example, TMXDI is used as one reaction component stream, and a trimethylol propane-acetone oxime mixture is used as the other reaction stream. Each component is preferably heated to a suitable temperature for processing (e.g., about 35°–40° C. for the TMXDI and about 70°–90° C. for the trimethylol propane-acetone oxime mixture). Dibutyl tin dialaurate is added to the trimethylol propane-acetone oxime mixture. The two component streams are brought together in the desired mix ratio, held in a reaction zone for a suitable residence time at the peak reaction exotherm temperature of about 140° C.–190° C. to produce the blocked isocyanate prepolymer. The analytically measured final unblocked isocyanate content is employed as the measure of completeness of the reaction. A longer residence time and lower temperature may also be utilized to complete the reaction and reduce the final unblocked isocyanate content. An optimum combination of utilizing the exothermic heat of reaction to establish a peak exothermic temperature, and controlling the residence time in the reaction zone is desirable for producing the blocked isocyanate products. To hasten the reaction to reach a peak exotherm, a suitable catalyst, such as dibutyl tin dilaurate, triethylene diamine, dibutyltin diacetate, dibutyltin dichloride, and stannous octoate, may be used. Such catalysts are premixed with the acetone oxime or polyol components or to a mixture of acetone oxime and polyol, if used. The peak exotherm reached may be substantially higher than the unblocking temperature for the blocked isocyanate curing agent but has not been found to be detrimental to the finished product.

The continuous process consists of adding appropriate amounts of the polyol, the acetone oxime and the catalyst to a holding tank. The contents in the holding tank are heated with continuous stirring to bring about a homogenous mixture. This mixture is then metered and mixed with a metered amount of tetramethylxylene diisocyanate in a continuous process to produce the finished blocked isocyanate.

Another method of production of the blocked isocyanate consists of adding an appropriate amount of tetramethylxylene diisocyanate to a reactor. Then, either the polyol or acetone oxime is added and allowed to react with or without the presence of a catalyst. This reaction mixture is then combined with the remaining component, i.e., either the polyol or acetone oxime and reacted to produce the finished blocked isocyanate product.

A further method of production of the blocked isocyanate is to add the tetramethylxylene diisocyanate to a reactor and then add, either separately or together, the polyol and the acetone oxime in the presence of a suitable catalyst.

The blocked isocyanate composition of the present invention can be combined with a suitable hydroxylated polyester to form powder coatings, preferably by melt mixing in an extruder. The blocked isocyanate compositions of the invention can also be used in single component baking enamels, such as those described in U.S. Pat. No. 4,649,067 to Gras, wherein the blocked isocyanate and a hydroxylated polyester are present in a suitable solvent at a high solids level.

The minimum curing temperature of powder coatings, baking enamels, and adhesives using the blocked isocyanate compositions of the invention are below 150° C. and in most cases are about 140° C. or below. The minimum curing temperature is, of course, related to the dissociation temperature of the blocked isocyanate. The blocked isocyanate compositions of the present invention have a dissociation temperature below 150° C. and usually have a dissociation temperature below about 140° C.

It is also important that a blocked isocyanate used as a cross-linking agent in combination with a hydroxylated polyester avoid cold flow. The hydroxylated polyester used in the powder coating should have a glass transition temperature ($T_g$) greater than about 50° C. The blocked isocyanate should have a $T_g$ of greater than 35° C. Suitable $T_g$ properties for the blocked isocyanate composition of the invention were provided by use of acetone oxime as the blocking agent but low $T_g$ resulted when blocking agents other than acetone oxime were used.

The following examples illustrate further features of the present invention but are intended to in no way limit the scope of the invention which is defined in the appended claims.

EXAMPLE I 1 mole of trimethylol propane (TMP) was combined with (5 mole) of acetone oxime and 2.21 grams of dibutyltin dilaurate. This mixture was heated to 98°–100° C. with continuous stirring. To this mixture was added, with stirring, 4 mole of tetramethylxylene diisocyanate (TMXDI), which was introduced at a temperature of 26°–28° C. A peak exotherm of 180°–190° C. was reached. The mixture was poured into an aluminum tray and allowed to cool. After cooling, the product obtained was clear, had a very light color, was non-tacky and was a friable solid. The product had a $T_g$ of 41° C.

The blocked isocyanate product was made into a powder coating in accordance with the following method: 1125.7 grams of the blocked isocyanate 902.4 grams of a hydroxylated polyester, having an OH value of 190, 20.9 grams of benzoin (an anti-pinhole agent obtained from Stauffer Chemicals) and 37.6 grams of a flow control agent were dry blended by high shear mixing. The dry blend was metered into an extruder and was mixed. The material exiting from the extruder was cooled on chill rolls. This material was ground to a powder form. The material was electrostatically sprayed onto steel test panels and baked at 129° C. for thirty minutes. After cooling to room temperature, the coated panel was subjected to 100 double rubs with a tissue saturated with methylethyl ketone. No part of the coating was removed and no loss of gloss was seen. This test indicates that a cured coating had been obtained.

EXAMPLE II 1 mole of trimethylol propane was combined with 4.6 mole of methylethyl ketoxime and 0.7 grams of dibutyltin dilaurate. This mixture was brought to 75°–78° F. with continuous stirring. To this mixture was added, with stirring, 3.75 mole of TMXDI at a temperature of 38°–40° C. A peak exotherm of 180° C. was reached and the mixture was poured into an aluminum tray to cool. Analysis showed that the $T_g$ was 25° C. indicating that methylethyl ketoxime is not a suitable blocking agent.

EXAMPLE III 0.83 mole of trimethylol propane was combined with 3.95 mole of epsilon caprolactam and 0.6 grams of dibutyltin dilaurate. This mixture was heated to 80°–85° C. with continuous stirring. To this mixture was added, with stirring, 3 mole of TMXDI. A peak exotherm of 170°–175° C. was reached and the material was poured into an aluminum tray to cool. Analysis showed that the $T_g$ was 23° C., indicating that epsilon caprolactam is not a suitable blocking agent.

The blocked isocyanate of the invention utilizing the reaction mixture of tetramethylxylene diisocyanate and acetone oxime offers the lowest temperature cure of any blocked isocyanate presently available.

EXAMPLE IV 5 moles of acetone oxime were heated to 70°–72° C. 2.21 grams of a dibutyltin dilaurate were added and mixed. This mixture was added to 4 moles of TMXDI at a temperature of 37°–39° C. with stirring. A peak exotherm of 137°–139 C. was reached. To this mixture was added 1 mole of trimethylol propane (TMP) at 64°–66° C. with stirring. A peak exotherm of 181°–183° C. was reached. This material was poured into a tray to cool. The product had a $T_g$ of 39° C.

EXAMPLE V 1 mole of trimethylol propane (TMP) was heated to 70°–72° C. 2.21 grams of dibutyltin dilaurate were added and mixed. This mixture was added to 4 moles of TMXDI at a temperature of 37°–39° C. with stirring. A peak exotherm of 153°–155° C. was reached. To this mixture was added 5 moles of acetone oxime at 70°–72° C. with stirring. A peak exotherm of 186°–88° C. was reached. This material was poured into a tray to cool. The product had a $T_g$ of 40° C.

EXAMPLE VI 4 moles of TMXDI are brought to 37°–39° C. in a reaction flask. A separating funnel is charged with 1 mole of trimethylol propane (TMP), 5 moles of acetone oxime and 2.21 grams of dibutyltin dilaurate. The contents of the funnel are heated to 70°–72° C. and stirred. The funnel is inserted in the neck of the reaction flask. The stirrer is turned on and 22 inches of mercury vacuum is pulled on the TMXDI to degas it. The TMP/acetone oxime is drawn into the reaction flask under vacuum over a period of 10 minutes. The maximum exotherm reached is 142°–44° C. The molten product is poured into an aluminum tray to cool. The product had a $T_g$ of 40° C.

What is claimed is:

1. A powder coating composition which is heat curable at below about 150° C. for use in the preparation of protective films comprising tetramethylxylene diisocyanate having the isocyanate groups thereof substantially blocked with acetone oxime, the blocked isocyanate having a Tg greater than about 35° C. and a hydroxylated polyester having a Tg of greater than about 50° C.

2. A powder coating composition in accordance with claim 1 which has less than about 2% of unblocked isocyanate.

3. A powder coating composition which is heat curable at below about 150° C. for use in the preparation of protective films comprising a polyisocyanate prepolymer derived from the reaction of tetramethylxylene diisocyanate and a polyol wherein the isocyanate groups are substantially blocked with acetone oxime, the prepolymer having a Tg greater than about 35° C. and a hydroxylated polyester having a Tg of greater than about 50° C.

4. A powder coating composition in accordance with claim 3 wherein said polyol is selected from trimethylol propane, ethylene glycol, 1,4-butane diol, 1,6-hexane diol, neopentyl glycol, diethylene glycol, triethylene glycol, dipropylene glycol, diethanol methylamine, triethanolamine, trimethylolethane, cyclohexane dimethanol and pentaerythritol.

5. A powder coating composition in accordance with claim 4 wherein said polyol is trimethylol propane.

6. A powder coating composition in accordance with claim 3 wherein said tetramethylxylene diisocyanate is present in said prepolymer at a level of from about 3 to 4 moles per mole of polyol.

7. A powder coating composition in accordance with claim 3 which has less than about 2% of unblocked isocyanate.

* * * * *

UNITED STATES PATENT AND TRADEMARK OFFICE
CERTIFICATE OF CORRECTION

PATENT NO. : 4,997,900
DATED : March 5, 1991
INVENTOR(S) : Larry F. Brinkman

It is certified that error appears in the above-identified patent and that said Letters Patent is hereby corrected as shown below:

Column 7, line 54, change "186° - 88°" to --186° - 188°--

Column 8, line 15, change "142° - 44°" to --142° - 144°--

Signed and Sealed this

Twenty-third Day of February, 1993

Attest:

STEPHEN G. KUNIN

Attesting Officer

Acting Commissioner of Patents and Trademarks